United States Patent
Liao et al.

(10) Patent No.: US 6,859,255 B2
(45) Date of Patent: Feb. 22, 2005

(54) METHOD OF FABRICATING A LIQUID CRYSTAL LIQUID DISPLAY PANEL

(75) Inventors: Shih-Hong Liao, Kao-Hsiung (TW); Yen-Chung Chang, Tao-Yuan Hsien (TW); Ying-Jyh Liao, Taipei Hsien (TW)

(73) Assignee: AU Optronics Corp., Hsin-Chu (TW)

( * ) Notice: Subject to any disclaimer, the term of this patent is extended or adjusted under 35 U.S.C. 154(b) by 0 days.

(21) Appl. No.: 10/604,833

(22) Filed: Aug. 20, 2003

(65) Prior Publication Data

US 2004/0114093 A1 Jun. 17, 2004

(30) Foreign Application Priority Data

Aug. 29, 2002 (TW) ........................................ 91119723 A

(51) Int. Cl.[7] .......................................... G02F 1/1339
(52) U.S. Cl. ...................................................... 349/190
(58) Field of Search ................................ 349/190, 187, 349/153

(56) References Cited

U.S. PATENT DOCUMENTS 6,081,306 A * 6/2000 Nagano ........................ 349/32

\* cited by examiner

*Primary Examiner*—Robert H. Kim
*Assistant Examiner*—Richard H Kim
(74) *Attorney, Agent, or Firm*—Winston Hsu

(57) ABSTRACT

A method of fabricating a liquid crystal display (LCD) panel. The LCD includes a first substrate positioned on an upper stage in a vacuum chamber, and a second substrate positioned on a lower stage in the vacuum chamber. A predetermined gap remains between the first substrate and the second substrate. The method includes vacuuming the vacuum chamber and horizontally aligning the first substrate with the second substrate. Following that, a first affixing process is performed to press a first portion of the first substrate on at least a dummy sealant on the second substrate. A second affixing process is then performed to press a second portion of the first substrate on a main sealant on the second substrate, thus completing combination of the first substrate and the second substrate.

24 Claims, 15 Drawing Sheets

METHOD OF FABRICATING A LIQUID CRYSTAL LIQUID DISPLAY PANEL

BACKGROUND OF INVENTION

1. Field of the Invention

The present invention relates to a method of fabricating an LCD panel, and more particularly, to a method of combining a first substrate and a second substrate of an LCD panel.

2. Description of the Prior Art

The advantages of liquid crystal displays include better portability, lower power consumption, and lower radiation. Therefore, LCDs are widely used in various portable products, such as notebooks, personal digital assistants (PDA), electronic toys, etc. A conventional LCD panel comprises a first substrate, a second substrate, and a liquid crystal layer filled up between the first and the second substrate. In the conventional method of implanting the liquid crystal layer, the first substrate and the second substrate are adhered together, and then the combined substrates are placed in a vacuum chamber so that the liquid crystal is implanted between the substrates by capillarity. However, the traditional method of implanting liquid crystal layer requires too much time, and causes the uniformity and yield problems as the large-size LCD develops. Therefore a one drop filling (ODF) method is highly developed to resolve the above-mentioned problems so that LCD panels can be applied in large-sized monitors.

Please refer to FIG. 1 to FIG. 3. FIG. 1 to FIG. 3 are schematic diagrams of fabricating an LCD panel according to the prior art. As shown in FIG. 1, according to the method of fabricating an LCD panel of the prior art, a substrate 10 having a specific size such as a glass substrate or a plastic substrate is provided, and a plurality of display panel 14 patterns are defined in an actually used area 12 for manufacturing display components of the second substrate. The second substrate can be a TFT substrate comprising thin film transistors, pixel electrodes, scan lines (gate line), and data lines (signal line) arranged in an array. Further the second substrate can be a color filter on array (COA) substrate or an array on color filter (AOC) substrate having thin film transistors, pixel electrodes, scan lines, and data lines arranged in an array and a color filter therein. If the second substrate is a COA substrate, the color filter is located above the thin film transistors; if the second substrate is an AOC substrate, the color filter is located below the thin film transistors. The substrate 10 has an orientation layer with orientation patterns thereon, and a plurality of spacers installed on the surface of the orientation layer. A sealant 16 is applied to a frame area outside the actually used area 12 of the substrate 10. Then liquid crystal molecules are dropped on the surface of the substrate 10 with pressure, motors, or others similar ways of applying the theorem of injector or ink jet. Following that, the substrate 10 and a first substrate such as a glass substrate or a plastic substrate comprising necessary components are positioned in a vacuum chamber where proper mechanical force and pressure are applied to affix the substrates. While the second substrate is an ordinary TFT substrate, the first substrate is a color filter substrate; while the second substrate is a COA or an AOC substrate, however, the first substrate is a glass or a plastic substrate. A gap for liquid crystal molecules is retained by spacers installed between the substrates. Finally the combined substrates are properly segmented and tested by external circuit.

For further explaining problems that may happen during the affixing process according to the prior art, FIG. 2 and FIG. 3 only show portions of the first and the second substrate. As shown in FIG. 2, while using ODF method to fabricate LCD panels according to the prior art, a first substrate 26 and a second substrate 28 are positioned respectively on a surface of an upper stage 22 and a lower stage 24 in a vacuum chamber 20. The first substrate 26 comprises display components such as color filters, black matrix, transparent electrodes, and orientation patterns, etc.; the second substrate 28 comprises display components such as thin film transistors, pixel electrodes, scan lines, data lines, orientation patterns, a plurality of liquid crystal drops 34 and spacers 36 arranged in an array, and a sealant 30 applied to a frame area on the surface. The power that the upper and lower stages use to carry the first and second substrates is vacuum adsorbability, mechanical force, friction, or ESD sucking disc. The orientation pattern on the surface of the first substrate 26 corresponds to the orientation pattern on the surface of the second substrate 28 for orienting liquid crystal molecules.

Following that, the vacuum chamber 20 is vacuumed, and a gap d1 is kept between the first substrate 26 and the second substrate 28 to horizontally align the first substrate 26 and the second substrate 28. After the alignment process as shown in FIG. 3, a mechanical force is applied to the upper stage 22 with a driving device 38 to vertically lower the first substrate 26 until it contacts the sealant 30 on the surface of the second substrate 28, and makes sure the frame areas on the first substrate 26 and the second substrate 28 tightly affixed together. Then the vacuum chamber 20 is returned to atmospheric pressure so that liquid crystal drops can spread out between the first substrate 26 and the second substrate 28 and forms a uniform liquid crystal layer. Finally, the first substrate 26 and the second substrate 28 are exited from the vacuum chamber 20, and a curing process is performed to harden the sealant 30 by using UV exposure apparatus and/or heater, or by other hardening methods.

For affixing the frame areas on the first and the second substrates, the mechanical force is equally applied to the upper stage for lowering the first substrate according to the prior art. During the affixing process, however, defects may occur because of particles or glass chippings remaining on the surface of the upper and lower stages. These gap defects (gap mura) could make the gap between substrates collapse, and further crush the spacers.

SUMMARY OF INVENTION

It is therefore a primary objective of the claimed invention to provide a method of fabricating an LCD panel to avoid the above-mentioned problems.

In the preferred embodiment of the claimed invention, a first substrate is positioned on a surface of an upper stage and a second substrate is positioned on a surface of a lower stage in a vacuum chamber, wherein a predetermined gap exists between the first substrate and the second substrate. Then the vacuum chamber is vacuumed, and the first and second substrates are aligned horizontally. Following that, a first affixing process is performed to affix a first part of the first substrate to at least a dummy sealant on the second substrate. Finally a second affixing process is performed to affix a second part of the first substrate to at least a main sealant on the second substrate for forming a desired cell gap so that liquid crystal molecules can spread uniformly.

In the claimed invention, the first part of the first substrate is tightly affixed to the dummy sealant on the second substrate during the first affixing process, and then pressure applied to the upper and lower stages is adjusted to affix the second part of the first substrate to the main sealant on the second substrate during the second affixing process. This can prevent display components located near the main sealant from being damaged by particles or glass chippings on the surface of the upper and lower stages. Furthermore, the gap defects of the substrates and the non-uniformity of the cell gap will be improved.

DETAILED DESCRIPTION

Figure 1:
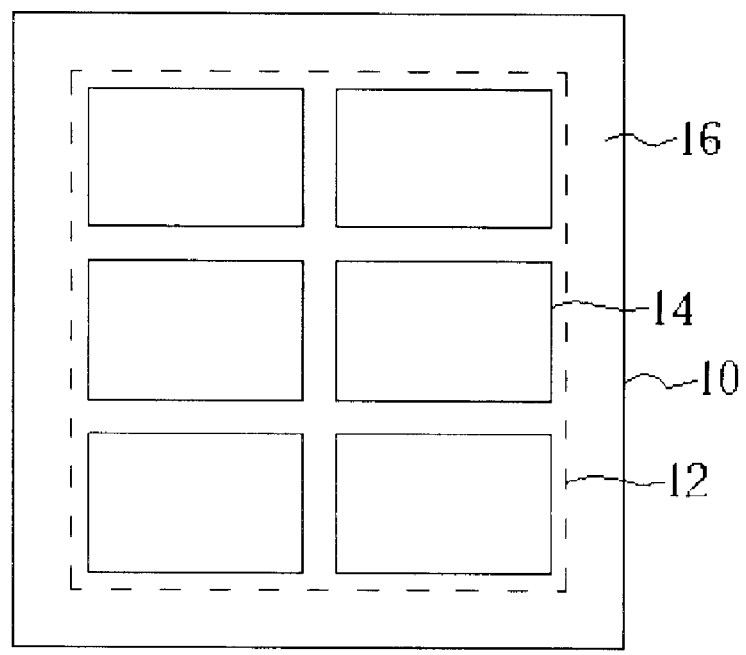
FIG. 1 to FIG. 3 are schematic diagrams of fabricating an LCD panel according to the prior art.
Figure 2:
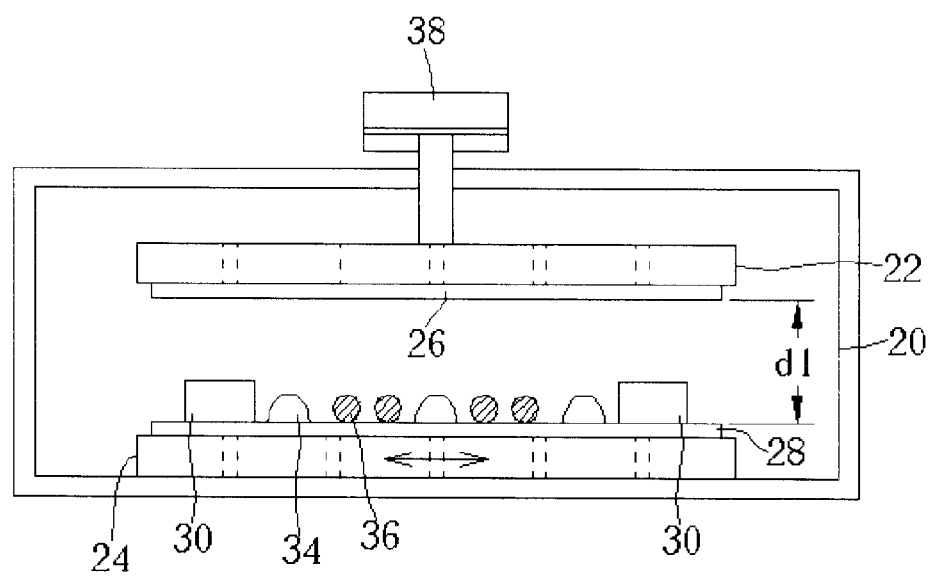
Figure 3:
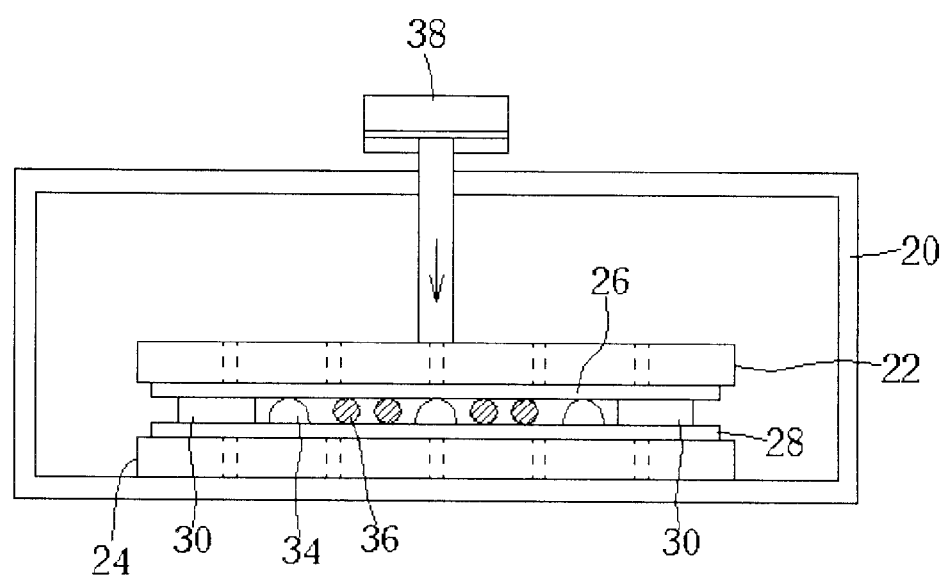
Figure 4:
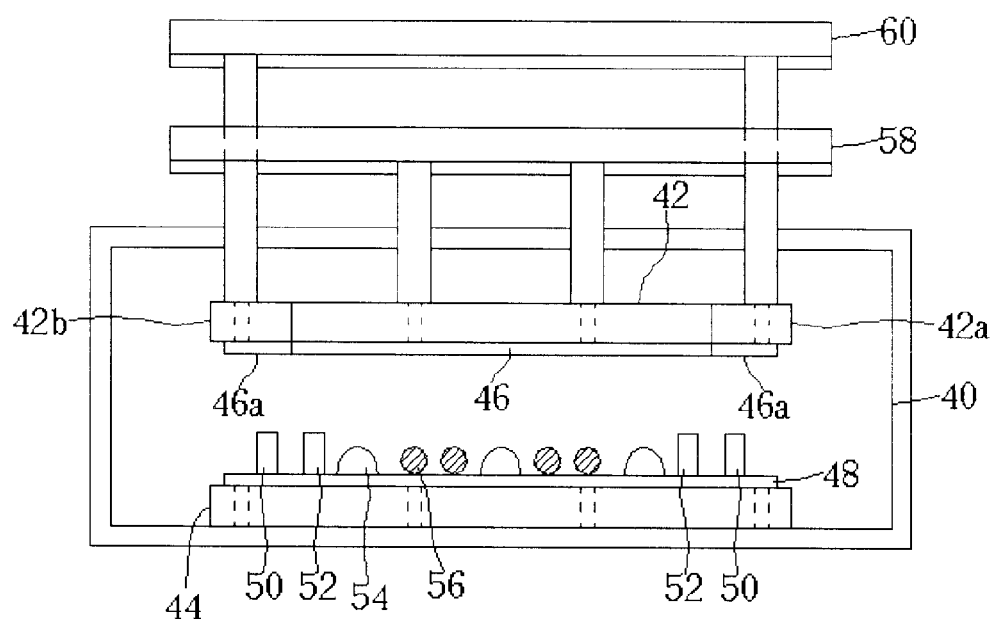
FIG. 4 to FIG. 9 are schematic diagrams of combining first and second substrates of an LCD panel according to the first embodiment of the present invention.
Figure 5:
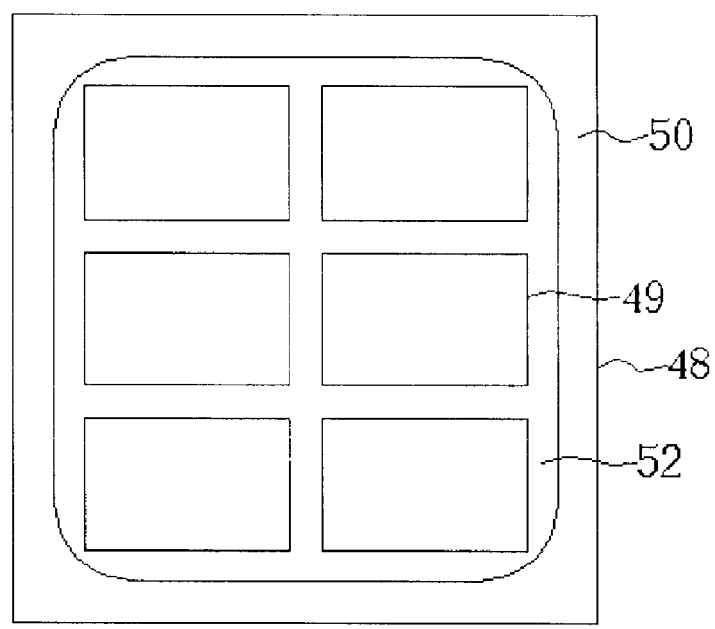

Please refer to FIG. 4 to FIG. 9. FIG. 4 to FIG. 9 are schematic diagrams of combining the first and second substrates of an LCD panel according to the first embodiment of the present invention. As shown in FIG. 4, a first substrate 46 and a second substrate 48 are respectively positioned on a surface of an upper stage 42 and a lower stage 44. The second substrate 48 comprises a plurality of liquid crystal drops 54, spacers 56, and other display components installed in an actually used area on the surface, a main sealant 52 surrounding the actually used area, and at least a dummy sealant 50 surrounding the liquid crystal drops 54, spacers 56, and main sealant 52. A central part is defined on the surface of the first substrate 48 for installing display components such as color filters, black matrix, transparent electrodes, orientation patterns, and a frame area 46a for applying a dummy sealant or for adhering to the dummy sealant 50 on the surface of the second substrate 48. In the present invention, the main sealant 52, the dummy sealant 50, and the spacers 56 are not limited to being installed on the second substrate 48, they may be contingently installed on the first substrate 46. Additionally, the upper stage 42 comprises a first part 42a and 42B connected to a driving device 60 for carrying a frame area 46a of the first substrate 46, and a second part connected to a driving device 58 for carrying the central part of the first substrate 46 where display components install.

The power that the upper stage 42 and the lower stage 44 use to carry the first substrate 46 and the second substrate 48 is vacuum adsorbability, ESD sucking disc, or proper friction. The orientation pattern of the first substrate 46 corresponds to the orientation pattern of the second substrate 48 for orienting the liquid crystal molecules. It is worth noticing that the function of the main sealant 52 is to protect the liquid crystal drops 54 against external contact; the function of the dummy sealant 50 is to enhance the isolation of the liquid crystal drops 54. Therefore the method and quantities of applying the main sealant 52 and the dummy sealant 50 can be optimized according to the isolation effect. As the preferred embodiment of the present invention shown in FIG. 5, a plurality of display panel 49 patterns are defined on the surface of the second substrate 48, and the second substrate 48 can be a glass substrate or a plastic substrate. The main sealant 52 surrounds the display panels 49 patterns, and the dummy sealant 50 surrounds the main sealant 52.

Figure 6:
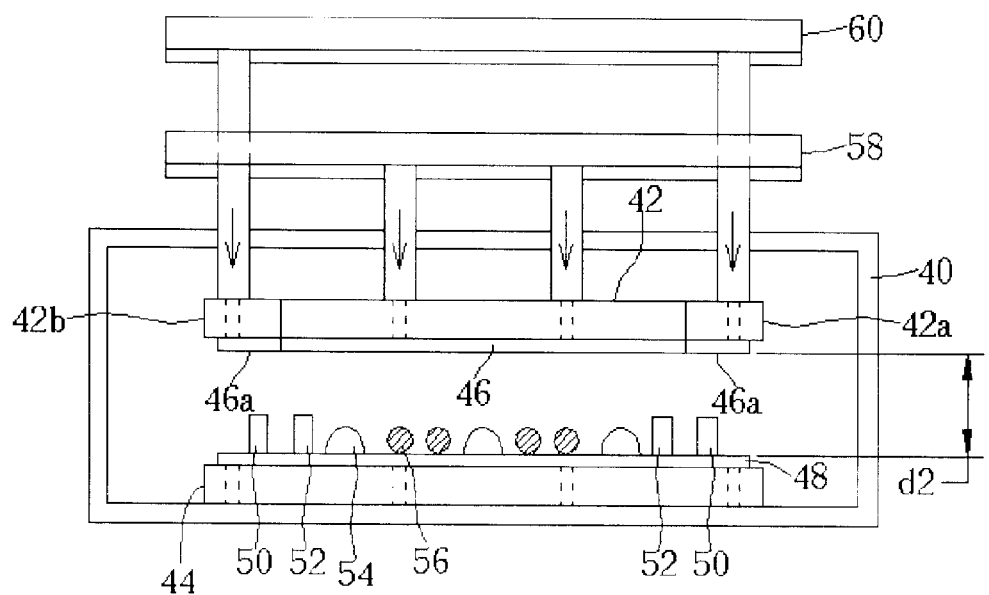
Figure 7:
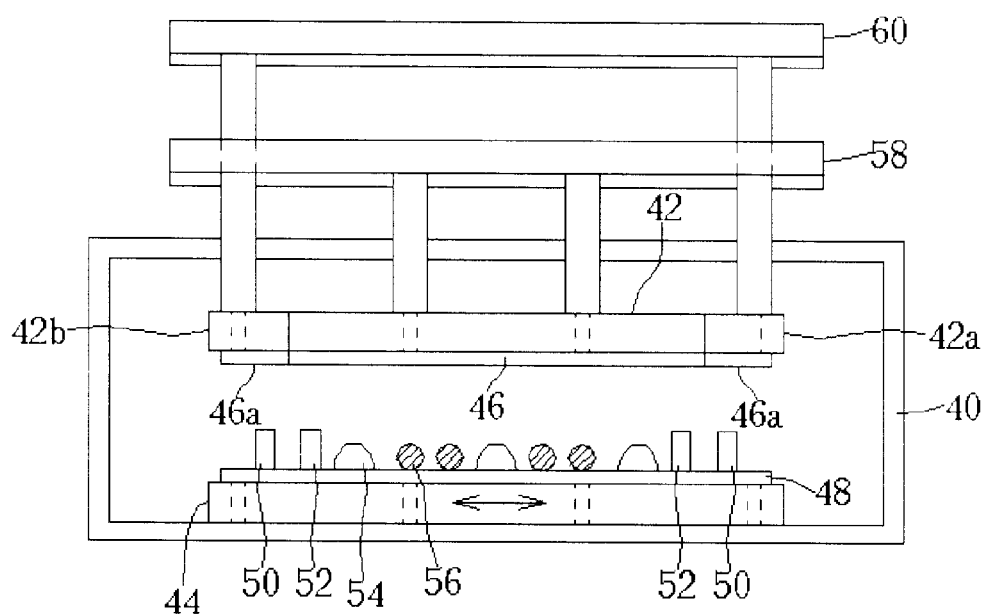
Figure 8:
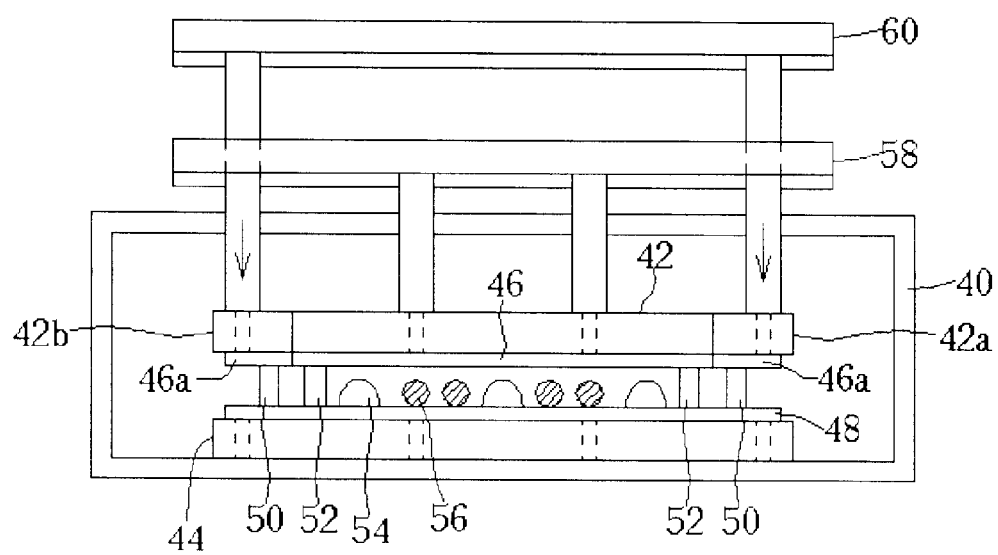

As shown in FIG. 6 and FIG. 7, the vacuum chamber is vacuumed, and the entire upper stage 42 is lowered by the driving devices 58 and 60 to maintain a gap d2 of about hundreds of micrometers (say 50 μm to 500 μm) between the first substrate 46 and the second substrate 48 for performing a horizontal alignment process. After the horizontal alignment process as shown in FIG. 8, a first affixing process is performed to continue lowering the first substrate 46 with a mechanical force applied to the first part 42a and 42b of the upper stage 42 by the driving device 60 until the frame area 46a contacts the dummy sealant 50 on the surface of the second substrate 48. The lowering distance or pressure is used as a controlling parameter to ensure that the frame area 46a of the first substrate 46 tightly adheres to the frame area of the second substrate 48. This avoids air permeating into the liquid crystal layer when the vacuum environment is removed. Then a dummy sealant curing process is optionally performed for hardening the entire or portions of the dummy sealant 50.

Figure 9:
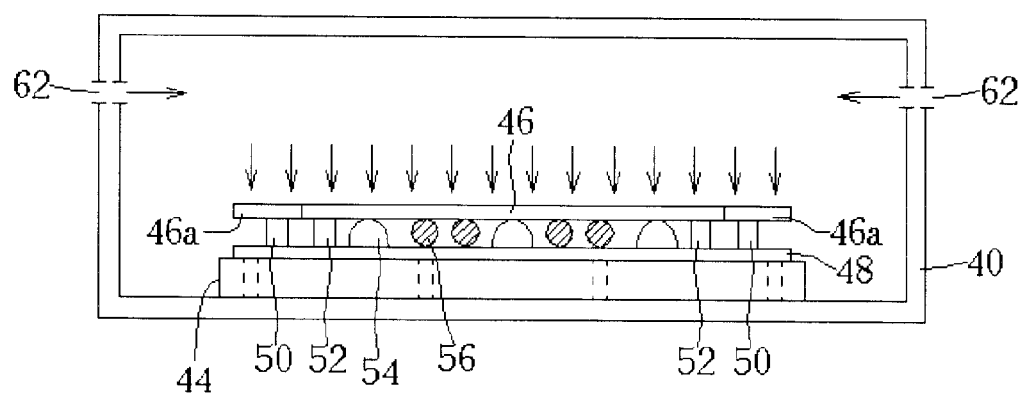

As shown in FIG. 9, a second affixing process is performed. The adsorptive power is first removed to release the central part of the first substrate 46 so that the central part falls down naturally until it contacts the main sealant 52. Then pressure in the vacuum chamber is adjusted to a predetermined pressure value. For example, air holes 62 are used to let the pressure in the vacuum chamber 40 return to 1 atm. The central part of the first substrate 46 is affixed to the main sealant 52, the liquid crystal drops 54, and the spacers 56 by atmospheric pressure, and a proper gap is kept between the first substrate 46 and the second substrate 48 for containing liquid crystal molecules. Finally a main sealant curing process is performed. The main sealant 52 is exposed by an UV exposure apparatus to harden the main sealant 52 for accomplishing the combination of the first substrate 46 and the second substrate 48. It is worth noticing that the dummy sealant curing process can be optionally combined with this process for simplifying processes.

In the present invention, only the dummy sealant 50 is affixed with a mechanical force so that the gap defect resulting from mechanical force applied to the liquid crystal layer can be avoided. The actually used area (display area) of LCD panels will not be damaged even if particles or glass chippings remain on the first part 42a and 42b of the upper stage 42 and on the surface of the lower stage 44.

Figure 10:
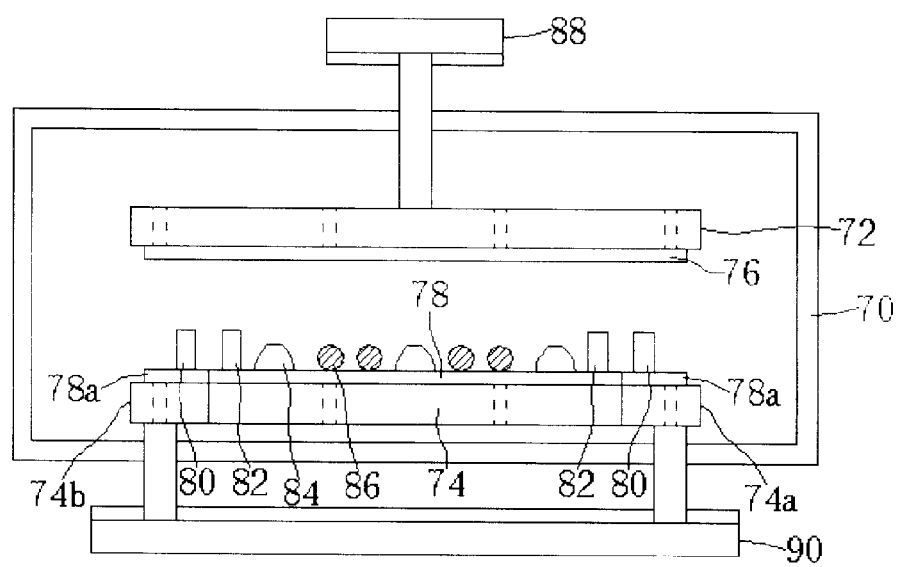
FIG. 10 to FIG. 14 are schematic diagrams of combining first and second substrates of an LCD panel according to the second embodiment of the present invention.

Please refer to FIG. 10 to FIG. 14. FIG. 10 to FIG. 14 are schematic diagrams of combining the first and second substrates of an LCD panel according to the second embodiment of the present invention. As shown in FIG. 10, a first substrate 76 and a second substrate 78 are positioned respectively on a surface of an upper stage 72 and on a surface of a lower stage 74 in a vacuum chamber 70. A central part is defined on the surface of the second substrate 78 for installing liquid crystal drops 84, spacers 86, and a main sealant 82 surrounding the liquid crystal drops 84 and the spacers 86. Further, a frame area 78a is defined on the surface of the second substrate 78 for applying a dummy sealant 80. In the present invention, the dummy sealant 80, the main sealant 82, and the spacers 86 can be also installed on the surface of the first substrate 76. A central part is defined on the surface of the first substrate 76 for installing display components such as color filters, black matrix, transparent electrodes, and orientation patterns, and a frame area is defined for applying a dummy sealant or for adhering to the dummy sealant 80 of the second substrate 78. In this embodiment, the upper stage 72 is connected to a driving device 88, and the lower stage 74 includes a second part 74a and 74b connected to a driving device 90 for carrying the frame area 78a of the second substrate 78.

The power that the upper stage 72 and the lower stage 74 use to carry the first substrate 76 and the second substrate 78 respectively is vacuum adsorbability, ESD sucking disc, or proper friction. The orientation pattern of the first substrate 76 corresponds to the orientation pattern of the second pattern 78 for orienting liquid crystal molecules. It is worth noticing that the function of the main sealant 82 is to protect the liquid crystal drops 84 against external contact; the function of the dummy sealant 80 is to enhance the isolation of the liquid crystal drops 84. Therefore the method and quantities of applying the main sealant 82 and the dummy sealant 80 can be optimized according to the isolation effect.

Figure 11:
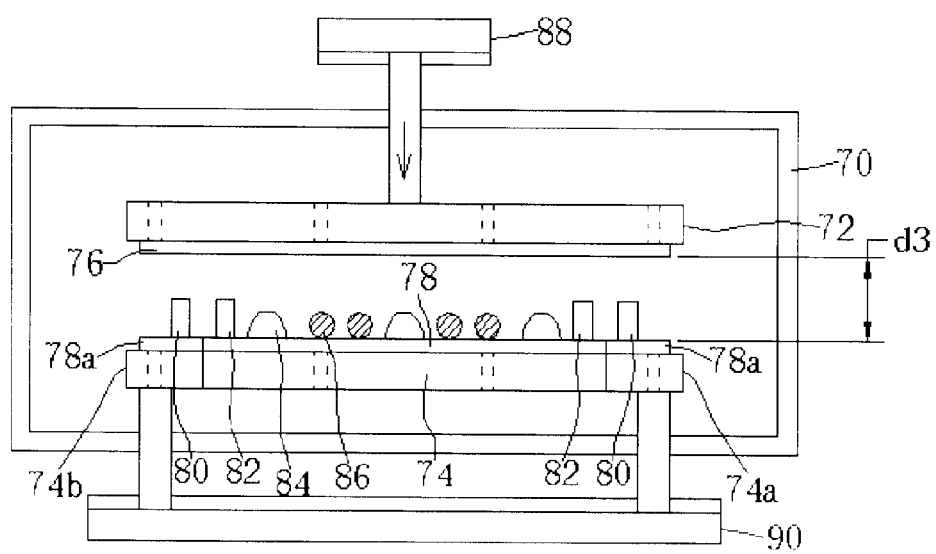
Figure 12:
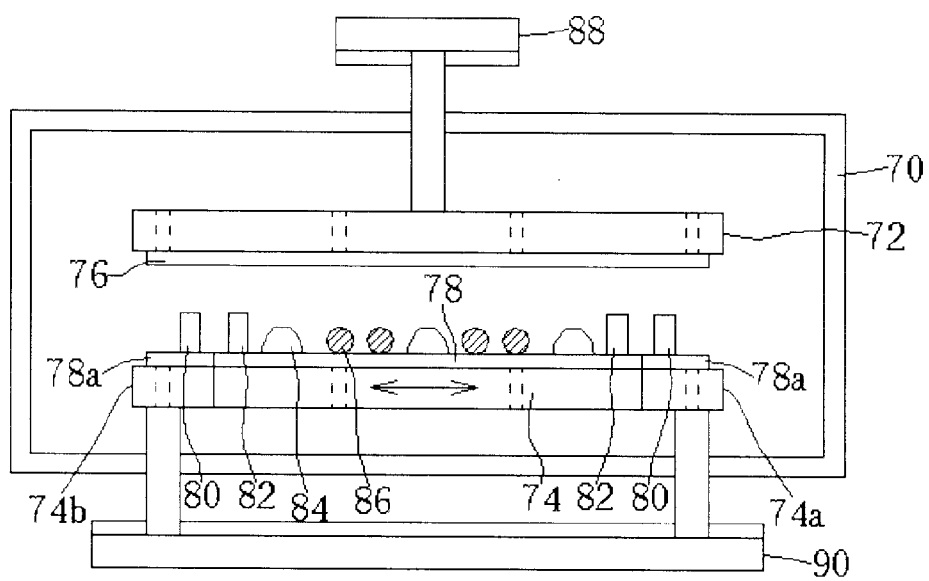
Figure 13:
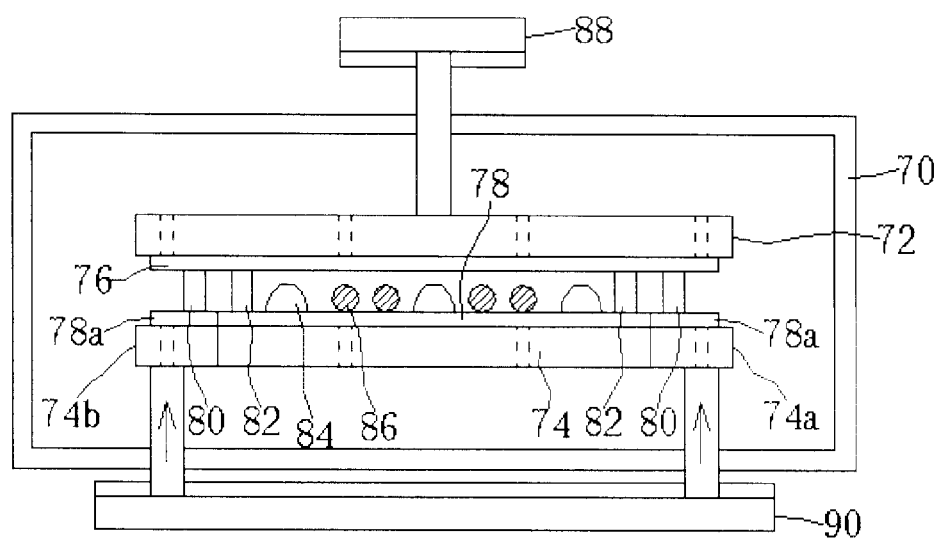

As shown in FIG. 11 and FIG. 12, the vacuum chamber is vacuumed, and the entire upper stage 72 is lowered by the driving devices 88 to maintain a gap d3 of about hundreds of micrometers (say 50 $\mu$m to 500 $\mu$m) between the first substrate 76 and the second substrate 78 for performing a horizontal alignment process. After the horizontal alignment process as shown in FIG. 13, a first affixing process is performed to raise the frame area 78a with a mechanical force applied to the second part 74a and 74b of the lower stage 74 by a driving device 90 until the frame area 78a of the second substrate 78 affixes to the dummy sealant 80 of the first substrate 76. The raising distance or pressure is used as a controlling parameter to ensure that the frame area of the first substrate 76 tightly adheres to the frame area 78a of the second substrate 78. This avoids air permeating into the liquid crystal layer when the vacuum environment is removed. Then a dummy sealant curing process is performed by an UV exposure apparatus for hardening the dummy sealant 80.

Figure 14:
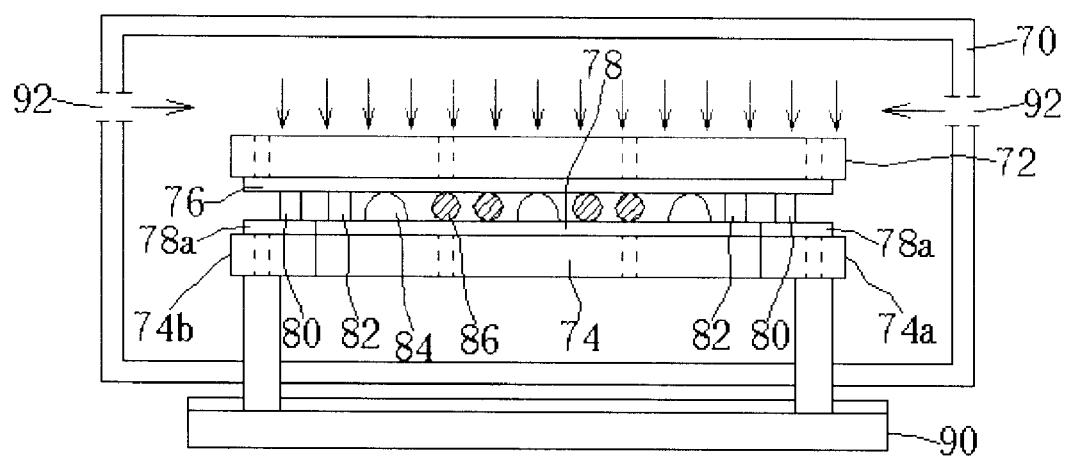

As shown in FIG. 14, a second affixing process is performed. The adsorptive power is first removed to release the central part of the first substrate 76 so that the central part falls down naturally until it contacts the main sealant 82. Then pressure in the vacuum chamber 70 is adjusted to a predetermined pressure value. For example, air holes 92 are used to let the pressure in the vacuum chamber 70 return to 1 atm. The central part of the first substrate 76 is affixed to the main sealant 82, the liquid crystal drops 84, and the spacers 86 by atmospheric pressure, and a proper gap is kept between the first substrate 76 and the second substrate 78 for containing liquid crystal molecules. Finally a main sealant curing process is performed. The main sealant 82 is exposed by an UV exposure apparatus to harden the main sealant 82 for accomplishing the combination of the first substrate 76 and the second substrate 78. It is worth noticing that the dummy sealant curing process can be optionally combined with this process for simplifying processes.

Figure 15:
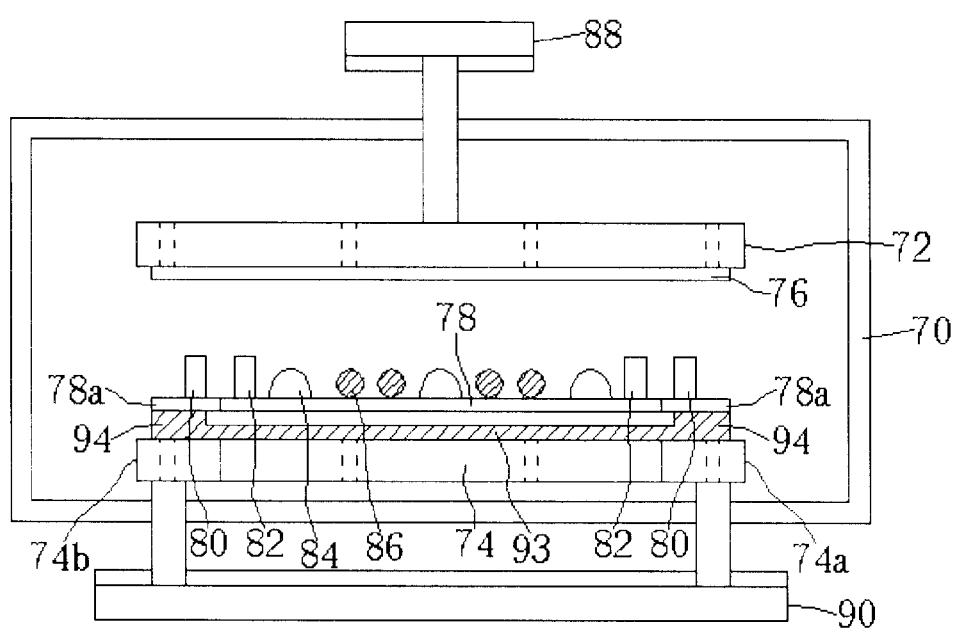
FIG. 15 is a schematic diagram of combining first and second substrates of an LCD panel by applying a pressure-enhancing film according to the present invention.

As shown in FIG. 15, the present invention can further include a pressure-enhancing film 93 installed between the upper stage 72 and the first substrate 76 or between the lower stage 74 and the second substrate 78. The pressure-enhancing film 93 has a salient 94 on the fringe for enhancing the pressure on the dummy sealant 80. In the affixing process, the salient 94 of the pressure-enhancing film 93 helps enhance pressure on the dummy sealant 80 instead of on the main sealant 82.

In the present invention, only the dummy sealant 80 is affixed with mechanical force so that the gap defect resulting from mechanical force applied to the liquid crystal layer can be avoided. The actually used area (display area) of the LCD panel will not be damaged even if particles or glass chippings remain on the frame area of the upper stage 72 and the first part 74a and 74b of the lower stage 74.

In contrast to the method of fabricating an LCD panel according to the prior art, the present invention has the following benefits:

1. Gap defects resulting from remaining particles or glass chippings are avoided. In the present invention, the dummy sealant is affixed with mechanical force whereas the main sealant is affixed by atmospheric pressure. Therefore display components installed near the main sealant will not be damaged in the affixing process.
2. Loose precision (smoothness and parallel degree) requirement of the upper and lower stages. The first and second substrates are affixed together only with a mechanical force in the prior art, thus the smoothness of stages is key to the quality of LCD panels. In the present invention, however, the upper and lower stages are only used to carry the substrates, and the mechanical force is only applied to the dummy sealant. Therefore the precision requirement is looser.
3. The non-uniformity of cell gap is avoided. The deformation of stages may occur during the vacuuming process, so necessary remedies are used to prevent the stages from deforming that will damage the substrates in the affixing process. In the present invention, the main sealant is not affixed with a mechanical force, thus the deformation of stages will not damage the substrates.
4. The spacers will not be crushed in the affixing process. The first and second substrates are affixed together with a mechanical force according to the prior art, thus particles remaining on the stages could compress and crush the spacers, which will lead to partial collapse of the cell gap. In the present invention, the spacers are not compressed by mechanical force so the problem is avoided.
5. Less cell gap diversity is reached. In the present invention, constant atmospheric pressure is used to affix the substrates, thus LCD panels are more uniform.
6. Devices for affixing and curing the dummy sealant can be combined together to avoid the relative shift of the first and second substrates during transportation.
7. The buffering pad is not required. In the prior art, a buffering pad is frequently installed between the substrate and the stage to buffer the mechanical force applied to the substrate. However, the selection, aging, and replacement of buffering pad complicate the design of device and increase the cost. In the present invention, this problem is avoided.
8. The total compression of the dummy sealant isolates the substrates from external contact. In the prior art, the mechanical force may not apply uniformly to the dummy sealant so that chinks may occur in the dummy sealant. In the present invention, mechanical force is only applied to the dummy sealant, so the dummy sealant will be entirely compressed which ensures the isolation of substrates.
9. Multiple choices of UV sealants lower the cost. The UV sealant used in the prior art is more expensive than other UV sealants. In the present invention different UV sealants can be used as main sealant and dummy sealant to lower the cost. The uniformity of LCD panels will not be affected because the affixing process of the main sealant and the dummy sealant are different.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method of manufacturing an LCD panel, the LCD panel comprising a first substrate positioned on a surface of an upper stage in a vacuum chamber and a second substrate positioned on a surface of a lower stage in the vacuum chamber, the first substrate and the second substrate having a predetermined gap between, the method comprising steps:

vacuuming the vacuum chamber and performing a horizontal alignment;

performing a first affixing process by applying a mechanical force for adhering the first substrate and the second substrate together with at least a dummy sealant; and performing a second affixing process by adjusting pressures of the vacuum chamber for further adhering the first substrate and the second substrate together with at least a main sealant installed inside the dummy sealant.

2. The method according to claim 1 wherein the first substrate comprises at least an orientation pattern installed on an opposite surface of the first substrate corresponding to the upper stage.

3. The method according to claim 2 wherein the second substrate comprises at least an orientation pattern, parallel to the orientation pattern of the first substrate, installed on an opposite surface of the lower stage corresponding to the lower stage.

4. The method according to claim 1 wherein the predetermined gap is between 50 $\mu$m to 500 $\mu$m.

5. The method according to claim 1 wherein the second substrate further comprises a plurality of liquid crystal drops and spacers, and the main sealant surrounds the liquid crystal drops and spacers.

6. The method according to claim 1 wherein the main sealant and the dummy sealant are installed on the surface of the second substrate facing the first substrate.

7. The method according to claim 1 wherein the main sealant and the dummy sealant are installed on the surface of the first substrate facing the second substrate.

8. The method according to claim 1 wherein the first affixing process comprises:

providing a mechanical force for lowering the upper stage until the first substrate, carried by the upper stage, tightly adheres to the second substrate with the dummy sealant.

9. The method according to claim 8 wherein the first affixing process further comprises a curing process for hardening portions of the dummy sealant.

10. The method according to claim 8 wherein the first affixing process further comprises a curing process for hardening the entire dummy sealant.

11. The method according to claim 1 wherein the second affixing process comprises:

releasing the first substrate carried by the upper stage for vertically lowering the first substrate until both the first substrate and the second substrate contact the main sealant; and adjusting pressure in the vacuum chamber to a predetermined pressure value so that the first substrate and the second substrate are tightly affixed to the main sealant.

12. The method according to claim 11 wherein the second affixing process further comprises a curing process for hardening the main sealant and the dummy sealant.

13. The method according to claim 11 wherein the predetermined pressure value is 1 atm.

14. The method according to claim 11 wherein the first affixing process lowers the upper stage with a mechanical force.

15. The method according to claim 1 wherein the second affixing process further comprises:

adjusting pressure in the vacuum chamber to a predetermined pressure value;

releasing the first substrate, carried by the upper stage, for vertically lowering the first substrate with the predetermined pressure until the substrate is tightly affixed to the main sealant; and performing a curing process for hardening the dummy sealant and the main sealant.

16. The method according to claim 15 wherein the predetermined pressure value is 1 atm.

17. The method according to claim 1 wherein the first affixing process comprises:

providing a mechanical force for raising the lower stage until the second substrate, carried by the lower stage, tightly adheres to the first substrate with the dummy substrate.

18. The method according to claim 17 wherein the first affixing process further comprises a curing process for hardening portions of the dummy sealant.

19. The method according to claim 17 wherein the first affixing process further comprises a curing process for hardening the entire dummy sealant.

20. The method according to claim 6 wherein the first affixing process raises the lower stage with a mechanical force until the dummy sealant tightly adheres to the first substrate.

21. The method according to claim 20 wherein the second affixing process comprises:

adjusting pressure in the vacuum chamber to a predetermined pressure value;

releasing the first substrate, carried by the upper stage, for vertically lowering the first substrate with the predetermined pressure until the substrate is tightly affixed to the main sealant; and performing a curing process for hardening the dummy sealant and the main sealant.

22. The method according to claim 21 wherein the predetermined pressure value is 1 atm.

23. The method according to claim 1 further comprising:

providing a pressure-enhancing film installed between the first substrate and the upper stage, wherein the pressure-enhancing film has a salient on the fringe, and the salient corresponds to the locations of the dummy sealant.

24. The method according to claim 1 further comprising:

providing a pressure-enhancing film installed between the second substrate and the lower stage, wherein the pressure-enhancing film has a salient on the fringe, and the salient corresponds to the locations of the dummy sealant.

* * * * *